Sept. 17, 1935.   J. B. W. GARDINER ET AL   2,014,378
PIPE COATING APPARATUS
Original Filed Aug. 3, 1933   2 Sheets-Sheet 2
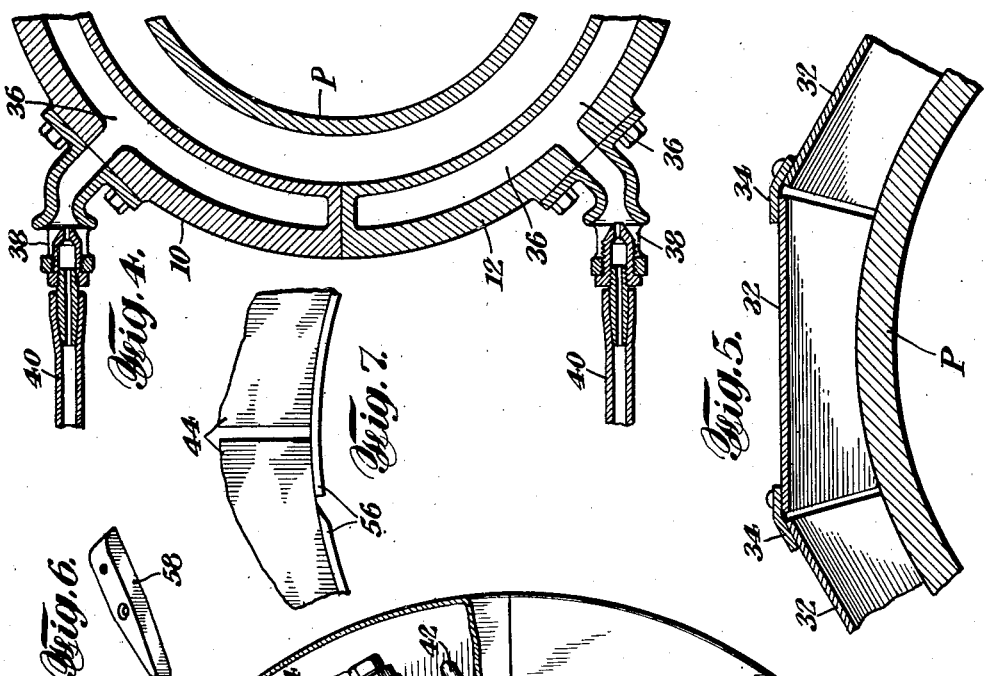
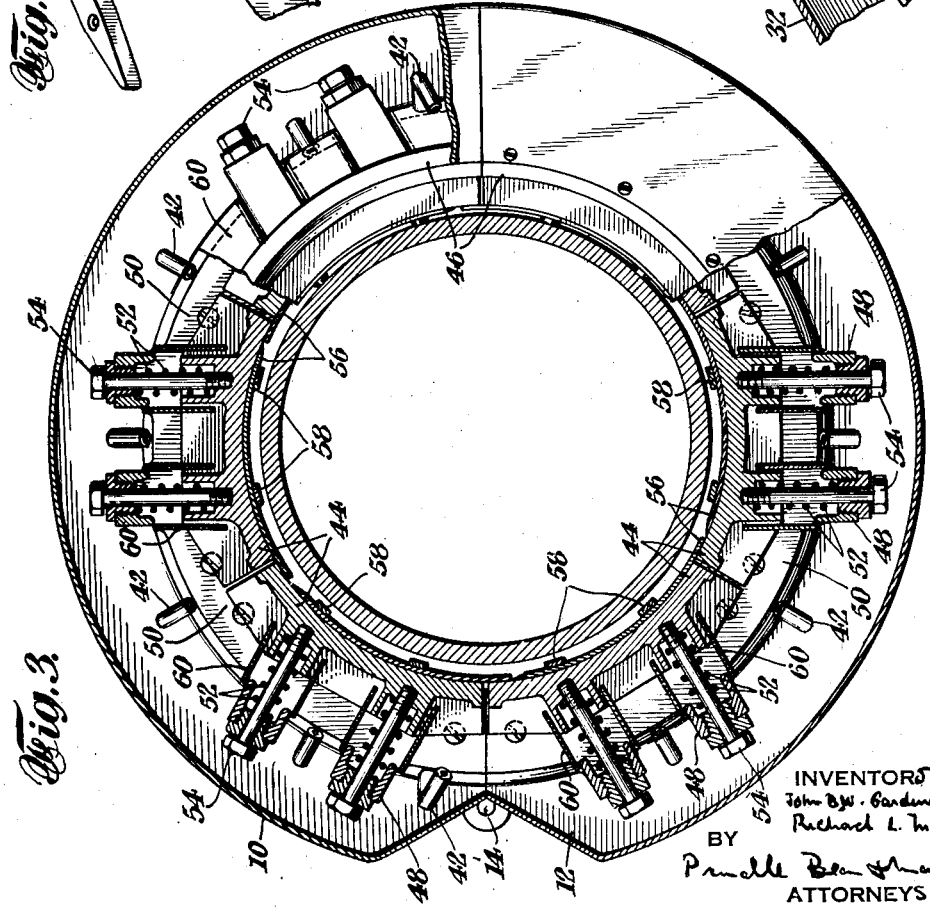
INVENTORS
John B.W. Gardiner
Richard L. Mann
BY
ATTORNEYS.

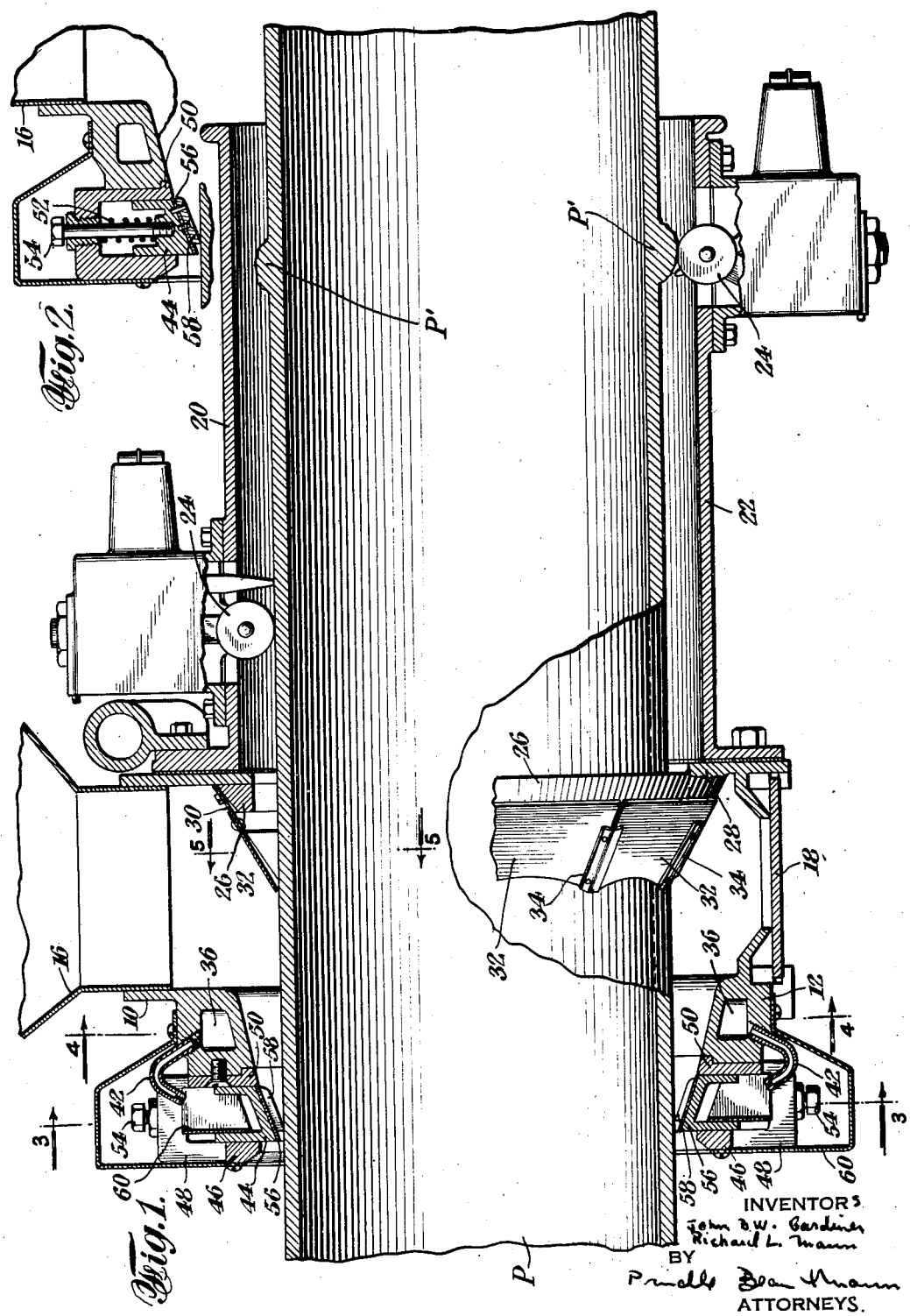

Patented Sept. 17, 1935

2,014,378

UNITED STATES PATENT OFFICE 2,014,378

PIPE COATING APPARATUS

John B. W. Gardiner, New York, and Richard L. Mann, Scarsdale, N. Y., assignors, by direct and mesne assignments, to Alan N. Mann, Scarsdale, N. Y., trustee Application August 3, 1933, Serial No. 683,456
Renewed December 3, 1934

6 Claims. (Cl. 91—30)

This application relates to an apparatus for coating pipe in accordance with the process set forth in Gardiner United States Patent No. 1,893,937, issued January 10th, 1933. The apparatus of this invention is aimed particularly to produce a coating of very uniform thickness on the pipe and also involves certain other structural benefits and improvements over the apparatus shown in the said earlier patent.

In the particular embodiment of the apparatus shown in the said Gardiner patent, the members forming the orifice which determines the thickness of the coating, are held in definite but adjustable position relative to the pipe during the normal operations, though these members can be sprung back away from the pipe when necessary. Such a structure demands that the pipe be accurately centered between these members. According to the present invention, the members forming the orifice are tensioned toward the pipe and each such member is provided with means for maintaining it spaced away from the pipe a predetermined distance. In other words, these members float against the pipe so that a certain amount of movement of the pipe within these members will not cause any substantial variation in the clearance between the members and the pipes.

It is possible to provide thin projections on the orifice members to contact with the pipe and keep these members spaced from the pipe a proper distance, but if such thin members are positioned in the plane of minimum diameter of the orifice, tracks or grooves will be left in the coating. However, if these contact members are not positioned in the plane of minimum diameter but are positioned at a place where the diameter of the orifice is substantially greater than the minimum, so that the orifice members contract beyond the point of contact, then such contraction will serve to squeeze the coating material against the pipe and the tracks of the contact members will be entirely or substantially covered, and this will be true even though the contact members extend quite close to the plane of minimum diameter.

This arrangement of the orifice members lends itself not only to a coating instrument intended to be moved along the pipe, but also makes it possible to provide a device in which the coating equipment remains stationary and the pipes are passed through it. It is of course to be understood that the pipe is to be submerged in a coating liquid in advance of this orifice but such submergence may take place either in a relatively stationary body of liquid or the pipe may be submerged in flowing liquid poured in above the pipe and withdrawn from the bottom.

Our invention can readily be understood by reference to the accompanying drawings, in which an illustrative example is shown embodying such invention in an apparatus somewhat similar to that shown in said Gardiner patent. In these drawings, Fig. 1 is a vertical section with a part of the pipe shown in full; Fig. 2 is a sectional view of one orifice device, such section being taken at a different point from that of Fig. 1; Fig. 3 is in part a section on line 3—3 of Fig. 1, in part an end view and in part an end view with a portion of the cover broken away; Fig. 4 is a sectional fragment on line 4—4 of Fig. 1; Fig. 5 is a sectional fragment on line 5—5 of Fig. 1; Fig. 6 is a detailed view of one of the studs or spacing devices used for keeping the orifice members a proper distance from the pipe, and Fig. 7 is an enlarged detail of a portion of the end of the machine.

The apparatus here shown comprises a main upper casting 10 and a corresponding lower casting 12. These two castings are hinged together as indicated at 14 so that they may be caused substantially to embrace a pipe P. At the middle of the top, the casting 10 is provided with a funnel 16 for the introduction of coating material, and at the bottom the casting 12 has a slide gate 18 for the removal of this material. Supplemental casting members 20 and 22 are attached to the castings 10 and 12 and serve as the principal guide or support portions of the machine. These castings carry wheeled supports 24, the action and details of which are not here described in detail, as they are fully set forth in the said earlier Gardiner patent, but it is to be understood that a sufficient number of said wheel supports are to be employed so that the pipe will be held approximately centered in the device.

Within the castings 10 and 12 are two members 26 and 28 which together make up a substantially equilateral polygon. In the particular embodiment shown the polygon is one having ten sides. Attached to each side of such polygon is a flat spring member 30 to which is riveted or otherwise attached a plate 32. Each plate 32 is flat but cut out on a curve at its lower edge so that when these members are positioned at the angles shown, the edges will lie close around the periphery of a pipe of the diameter for which the machine is designed; in other words, the springs 30 and plates 32 together make up a pyramidal member having an opening substantially concentric with the axis of the pyramid which is circular when viewed along the line of such axis. In order to prevent gas being left between the plates 32 when they are spread apart in any manner as by a weld on the pipe, angle cover plates 34 are supplied each of which is attached to one plate 32 and slides over another such plate.

Castings 10 and 12 each are cored out to form a gas duct 36 into which gas can be introduced through a mixer 38, from a tube 40 which is intended to be connected to a portable gas tank. Running out from the gas ducts are a series of burner jets 42 intended to heat the orifice end of the machine and to keep it hot in the event that operations are stopped at any time.

The orifice proper is formed by a series of members 44, half of which are carried by the casting 10 and half by the casting 12. In the present example six of these members are shown, three in each casting (see Fig. 3). Each member 44 has an inner face which is arcuate when viewed from the end of the machine and is bevelled in section, so that when these members are assembled, they together form a section of a cone. These members are intended to slide radially relative to the castings which carry them, and are held in place by two half rings 46 which together run around the end of the machine. The ring members 46 are connected to their respective castings by bridge members 48 which in turn are connected together by half rings 50. The half rings 50 are screwed directly to the respective castings as shown in Fig. 1, and the members 44 move radially between the half rings 50 and the half rings 46, as clearly indicated in Fig. 2. The members 44 are tensioned inwardly by springs 52 which surround bolts 54 which are so mounted as to give an adjustable inward limit to the movement of the members 44.

Mounted on the inward conical faces of the members 44 are plates 56 which do not exactly register with their corresponding members 44 but are so positioned that the end of one plate member 56 extends over a small amount of the face of an adjacent member 44. The edge of this overhanging portion of the face plate is bevelled as indicated in Fig. 7. Because of this construction, when the members 44 move radially outward there will be no gaps left between them, the gaps being closed by the overhanging face plates, and when the members 44 contract and so come closer together, any coating material will be forced back into its proper position by the bevelled edge of the face plates 56.

In assembling the machine, the members 44 ordinarily will be adjusted (by adjustment of the bolts 54) so that the orifice defined by these members will be substantially of the diameter of the pipe to be coated. Obviously if the orifice remained of this diameter, it would be impossible to put a coating of substantial thickness on the pipe. To overcome this situation, each member 44 carries two contact members or studs 58 which are connected to the members 44 through the face plates 56 as indicated in Fig. 2. As shown in Fig. 6, these contact members or studs have a relatively narrow tip which faces toward the most restricted part of the orifice, but as shown in Fig. 2 the studs 58 are so positioned that they do not actually enter the most restricted part of the orifice but are spaced inward a short distance therefrom. The studs 58 are preferably made separable from the orifice members 44, for these studs receive a great deal of wear and should be readily replaceable.

In operating the device, the castings 10 and 12 are clamped together around the pipe to be coated, and the structure is supported by the wheel supports 24 in such a way that the pipe P is substantially concentric with the structure. Irrespective of some deviation or irregularity in the pipe, the orifice formed by the members 44 will be almost exactly concentric with the pipe, for the position of the members 44 will be determined by the contact of the studs 58 with the pipe, and it is obvious that the clearance of the orifice will depend upon the thickness of these studs. If now a viscous liquid, such as a hot bituminous pipe coating, is poured in through the funnel 16, a section of the pipe will be submerged. The flow of this liquid toward the wheel supports will be prevented by the plates 32 but if the device as a whole is moved along the pipe with the wheel support end leading, the friction between the pipe and the coating material and the inertia of the coating material will cause a pressure of the coating material toward the conically arranged members 44, and as the device moves along a coating of substantially uniform thickness (equal to the clearance caused by the studs 58) will be left around the pipe. If now a weld is reached, as indicated at P', the wheel members 24 will operate in the manner described in the said earlier Gardiner patent; when the point is reached where the weld is under the plates 32, these plates will spring apart (being mounted on spring members 30), but no gaps will be left between them because of the action of the cover plates 34; as the machine moves further along the studs 58 will ride up on the weld causing the members 44 to move radially outward and ordinarily the movement of the machine will be rapid enough so that as the weld is passed and the members 44 spring inwardly to place, they will not contact with the weld. In other words, the frictional wear on the orifice end of the device is entirely taken up by the studs 58 which can be readily replaced when worn thin or changed in order to modify the thickness of the coating.

When first starting up the machine, or when operations are interrupted it may be desirable to heat up the orifice end. This can readily be done by the gas jets 42. In order to protect these jets and to prevent leakage from the orifice getting into the springs and moving parts, cover plates 60 are supplied.

It is to be understood that the embodiment here described in detail is given only by way of illustration and that our invention may be modified in many particulars and used with structures of widely different types, without departing from the spirit of our invention.

What we claim is:

1. In a device of the type described, in combination with means for submerging a section of pipe in a viscous material and means for holding the device in approximately uniform radial relation to the pipe while permitting relative longitudinal movement between the device and the pipe, an orifice for regulating the thickness of the coating on the pipe comprising a plurality of orifice members movable in a generally radial direction but tensioned inwardly and relatively narrow contact members carried by said orifice members and adapted to press against the pipe whereby said orifice members are held spaced from the pipe a substantially constant distance during relative movement between the pipe and the device in a direction longitudinal of the pipe.

2. A structure as specified in claim 1, in which said orifice members are assembled to form a section of a cone with its restricted end pointing away from the aforesaid submerging means and in which such contact members are within said cone section but are spaced a substantial distance from the plane of minimum diameter thereof.

3. A structure as specified in claim 1, in which each of said orifice members has a thin facing member with the facing members overlapping adjacent orifice members, so that no opening will be left between the orifice members when they move radially outward.

4. In combination, two members forming a sleeve adapted to be clamped around a pipe, substantially flat members at one end of the sleeve forming a section of a many-sided pyramid positioned with its smaller end facing inward and each such member having its inner end shaped in a concave curve to form a circular opening through between them, spring mountings for said members permitting them to open radially outward, orifice members for the other end of the sleeve movable radially and means for holding said orifice members out of contact with but closely adjacent to a pipe around which such sleeve is clamped and which is contacted by the said flat members.

5. In a device of the type described the combination of a plurality of orifice members arranged to form an approximate circular opening and adapted to move in a general radial direction, means for tensioning such members inwardly, and readily replaceable contact members carried by the orifice members adapted to keep the orifice members a predetermined distance from a pipe in the orifice.

6. In a device of the type described, the combination of two body members adapted to be clamped around a pipe, a plurality of orifice members carried by the body members and movable radially relative to the body members, a duct in the body members for the circulation of a heating medium and means for applying heat therefrom to said orifice members.

JOHN B. W. GARDINER.
RICHARD L. MANN.